United States Patent
Yuan

(10) Patent No.: US 11,800,217 B2
(45) Date of Patent: Oct. 24, 2023

(54) MULTIMEDIA DATA PROCESSING METHOD AND APPARATUS

(71) Applicant: GREE ELECTRIC APPLIANCES, INC. OF ZHUHAI, Guangdong (CN)

(72) Inventor: Mingfei Yuan, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 46 days.

(21) Appl. No.: 17/605,460

(22) PCT Filed: Dec. 25, 2019

(86) PCT No.: PCT/CN2019/128161
§ 371 (c)(1),
(2) Date: Oct. 21, 2021

(87) PCT Pub. No.: WO2020/215776
PCT Pub. Date: Oct. 29, 2020

(65) Prior Publication Data
US 2022/0217266 A1 Jul. 7, 2022

(30) Foreign Application Priority Data
Apr. 22, 2019 (CN) .......................... 201910324559.2

(51) Int. Cl.
*H04N 23/60* (2023.01)
*G06V 20/40* (2022.01)
*H04N 5/262* (2006.01)

(52) U.S. Cl.
CPC .............. *H04N 23/64* (2023.01); *G06V 20/48* (2022.01); *H04N 5/2621* (2013.01)

(58) Field of Classification Search
CPC .. H04N 23/64; H04N 5/2621; H04N 21/2743; H04N 21/4223; H04N 23/60;
(Continued)

(56) References Cited

U.S. PATENT DOCUMENTS

2003/0067551 A1* 4/2003 Venturino ............ H04N 23/635
348/333.02
2007/0171282 A1* 7/2007 Yanagi ............... H04N 1/32122
348/207.99

(Continued)

FOREIGN PATENT DOCUMENTS

CN 105681891 A 6/2016
CN 105893412 A 8/2016
(Continued)

OTHER PUBLICATIONS

Extended European Search Report for European Application No. 19926007.6 dated Apr. 19, 2022 (12 pages).

*Primary Examiner* — Ahmed A Berhan
(74) *Attorney, Agent, or Firm* — J. Miguel Hernandez; James R. Gourley; Carstens, Allen & Gourley, LLP

(57) ABSTRACT

Multimedia data processing method and apparatus. The method comprises: acquiring first multimedia data; performing multi-dimensional analysis on the first multimedia data to obtain multimedia dimensional information; and performing video photographing according to the multimedia dimension information to obtain second multimedia data. The present application solves the technical problem of a poor video imitation photographing effect because information of imitation photographing video cannot be acquired in the prior art.

14 Claims, 3 Drawing Sheets

(58) Field of Classification Search
CPC ................ H04N 23/667; H04N 23/80; H04N 21/44008; G06V 20/48; G06V 20/40; G06T 7/00; G11B 27/031
See application file for complete search history.

(56) References Cited

U.S. PATENT DOCUMENTS

2014/0007149 A1* 1/2014 Huang ............... G06Q 30/0255
725/12
2020/0321029 A1 10/2020 Cui et al.

FOREIGN PATENT DOCUMENTS

| | | | | | |
|---|---|---|---|---|---|
| CN | 105898133 | A | | 8/2016 | |
| CN | 106060655 | A | | 10/2016 | |
| CN | 106657810 | A | | 5/2017 | |
| CN | 108109161 | A | | 6/2018 | |
| CN | 108566191 | A | * | 9/2018 | ..... H03K 19/017509 |
| CN | 108566519 | A | | 9/2018 | |
| CN | 108600825 | A | | 9/2018 | |
| CN | 109145840 | A | | 1/2019 | |
| CN | 109547694 | A | | 3/2019 | |
| CN | 110062163 | A | | 7/2019 | |
| CN | 113727025 | A | | 11/2021 | |
| JP | 2003263095 | A | | 9/2003 | |
| JP | 2007213668 | A | | 8/2007 | |

\* cited by examiner

MULTIMEDIA DATA PROCESSING METHOD AND APPARATUS

CROSS-REFERENCE TO RELATED APPLICATION

This application is a U.S. National Stage of international Application No PCT/CN2019/128161, filed on Dec. 25, 2019, entitled Multimedia Data Processing Method and Apparatus and published as WO 2020/215776 A1 on Oct. 29, 2020, which claims priority to Chinese Patent Application with No. 201910324559.2 and filed on Apr. 22, 2019, the content of which is expressly incorporated herein by reference in its entirety. Every patent application and publication listed in this paragraph is hereby incorporated by reference in its entirety, as an example.

TECHNICAL FIELD

The present disclosure relates to the field of multimedia, and particularly to a multimedia data processing method and apparatus.

BACKGROUND

With the in-depth popularization of the mobile Internet, online videos, especially short videos, have widely appeared in people's daily lives, and have had a deep impact on people's lives. People can watch the short videos through third-party clients in their leisure time, and can also imitate and shoot the short videos through the third-party clients.

SUMMARY

The embodiments of the present disclosure provide a multimedia data processing method and apparatus, to at least solve the technical problem of low effect of imitation shooting of the video due to the inability to obtain the information of the video to be imitated, known to the inventors.

In one aspect of the embodiments of the present disclosure, a multimedia data processing method is provided, including: acquiring first multimedia data; performing a multi-dimensional analysis on the first multimedia data to obtain multimedia dimension information; performing video shooting according to the multimedia dimension information to obtain second multimedia data.

In some embodiments, the performing the multi-dimensional analysis on the first multimedia data to obtain the multimedia dimension information includes: detecting a number of scenes constituting the first multimedia data; when detecting that the number of scenes is multiple, acquiring a switching effect among multiple scenes and scene information corresponding to each scene.

In some embodiments, the performing the multi-dimensional analysis on the first multimedia data to obtain the multimedia dimension information includes: detecting a number of scenes constituting the first multimedia data; when detecting that the number of scenes is one, acquiring scene information corresponding to the scene.

In some embodiments, the detecting the number of scenes constituting the first multimedia data includes: detecting a scene corresponding to each frame in the first multimedia data; determining the number of scenes constituting the first multimedia data according to a matching degree between two scenes corresponding to two adjacent frames.

In some embodiments, the detecting the number of scenes constituting the first multimedia data includes: detecting a scene corresponding to each frame in the first multimedia data; determining the number of scenes constituting the first multimedia data according to a matching degree between two scenes corresponding to two adjacent frames.

In some embodiments, the multimedia data processing method further includes: when detecting that a scene object comprises a preset object, identifying object information of the preset object, wherein the object information comprises at least one of: an expression, an action, and a special effect of the preset object.

In some embodiments, the multimedia data processing method further includes: when detecting that a scene object comprises a preset object, identifying object information of the preset object, the object information comprises at least one of: an expression, an action, and a special effect of the preset object.

In some embodiments, the performing the video shooting according to the multimedia dimension information to obtain the second multimedia data includes: acquiring scene information corresponding to each scene in the first multimedia data and a switching effect among the multiple scenes; performing the video shooting according to the scene information to obtain third multimedia data corresponding to each scene; setting a switching effect among multiple third multimedia data according to the switching effect, to obtain second multimedia data.

In some embodiments, the performing the video shooting according to the multimedia dimension information to obtain the second multimedia data includes: acquiring scene information corresponding to the first multimedia data; performing the video shooting according to the scene information to obtain the second multimedia data.

In some embodiments, the multimedia data processing method further includes: during performing the video shooting according to the multimedia dimension information to obtain the second multimedia data, detecting a matching degree between the second multimedia data and a corresponding scene; generating camera control information when the matching degree is less than a preset matching degree; generating prompt information according to the camera control information, wherein the prompt information is configured to cause a user to control a shooting device to perform the video shooting according to the camera control information.

In some embodiments, the multimedia data processing method further includes: during performing the video shooting according to the multimedia dimension information to obtain the second multimedia data, detecting a matching degree between the second multimedia data and a corresponding scene; generating camera control information when the matching degree is less than a preset matching degree; generating prompt information according to the camera control information, wherein the prompt information is configured to cause a user to control a shooting device to perform the video shooting according to the camera control information.

In some embodiments, the multimedia data processing method further includes: before acquiring the first multimedia data, detecting a video shooting instruction; when detecting that the video shooting instruction is an imitation shooting instruction, controlling a shooting device to enter an imitation shooting mode, wherein the imitation shooting mode is configured to perform the video shooting according to existing multimedia data to obtain multimedia data with a same shooting effect as the existing multimedia data; when detecting that the video shooting instruction is a regular shooting instruction, controlling the shooting device to enter a regular shooting mode.

In another aspect of the embodiments of the present disclosure, a multimedia data processing apparatus is provided, including: an acquisition module, configured to acquire first multimedia data; an analysis module, configured to perform multi-dimensional analysis on the first multimedia data to obtain multimedia dimension information; a processing module, configured to perform video shooting according to the multimedia dimension information to obtain second multimedia data.

In another aspect of the embodiments of the present disclosure, a storage medium is provided, on which a program is stored, wherein the program, when executed, controls a device where the storage medium is located to perform the multimedia data processing method.

In another aspect of the embodiments of the present disclosure, a processor is provided, which is configured to execute a program, the program, when executed, performs the multimedia data processing method.

In the embodiments of the present disclosure, the multimedia data is analyzed, and the video shooting is performed according to the analyzed information; after the first multimedia data is obtained, the multi-dimensional analysis is performed on the first multimedia data to obtain the multimedia dimension information, and finally the video shooting is performed according to the multimedia dimension information to obtain the second multimedia data. It is easy to note that by analyzing the first multimedia data, the filter, special effect, transition and other information of the first multimedia data can be obtained, and then the user adopts the same multimedia dimension information as the first multimedia data to perform the video shooting to obtain second multimedia data with the same effect as the first multimedia data. Since the second multimedia data is obtained by shooting according to the information obtained by analyzing the first multimedia data, the second multimedia data has the same effect as the first multimedia data. In view of this, the solution provided by the present disclosure achieves the purpose of performing the imitation shooting on the multimedia data, thereby achieving the technical effect of generating a video with the same effect as the source multimedia data, providing the shooting experience to the user, and solving the technical problem of low effect of the imitation shooting of the video due to the inability to obtain the information of the video to be imitated, known to the inventors.

BRIEF DESCRIPTION OF THE DRAWINGS

The accompanying drawings described here are utilized to provide a further understanding of the present disclosure and constitute a part of the present disclosure. The exemplary embodiments of the present disclosure and the description are utilized to explain the present disclosure, and do not constitute an improper limitation on the present disclosure. In the accompanying drawings.

DETAILED DESCRIPTION

In order to enable those skilled in the art to better understand the solution of the present disclosure, the technical solution in the embodiments of the present disclosure will be described clearly and completely in conjunction with the accompanying drawings in the embodiments of the present disclosure. Obviously, the described embodiments are merely a part of the embodiments of the present disclosure, rather than all the embodiments. Based on the embodiments in the present disclosure, all other embodiments obtained by those of ordinary skill in the art without any creative work should fall within the protection scope of the present disclosure.

It should be noted that the terms "first" and "second", etc., in the specification and claims of the present disclosure and the above-mentioned drawings are utilized to distinguish similar objects, and are not necessarily utilized to describe a specific sequence or order. It should be understood that the data used in such manner can be interchanged under appropriate circumstances, so that the embodiments of the present disclosure described herein can be implemented in an order other than those illustrated or described herein. In addition, the terms "including" and "having" and any transformations thereof are intended to cover non-exclusive inclusions. For example, a process, method, system, product, or device that includes a series of steps or units is not definitely limited to those clearly listed steps or units, but may include other steps or units that are not clearly listed or inherent to these processes, methods, products, or devices.

Embodiment I

According to some embodiments of the present disclosure, a multimedia data processing method is provided. It should be noted that the steps shown in the flow chart of the accompanying drawings can be executed in a computer system such as a set of computer-executable instructions, and although a logical sequence is shown in the flow chart, in some cases the steps shown or described can be performed in a different order than here.

Figure 1:
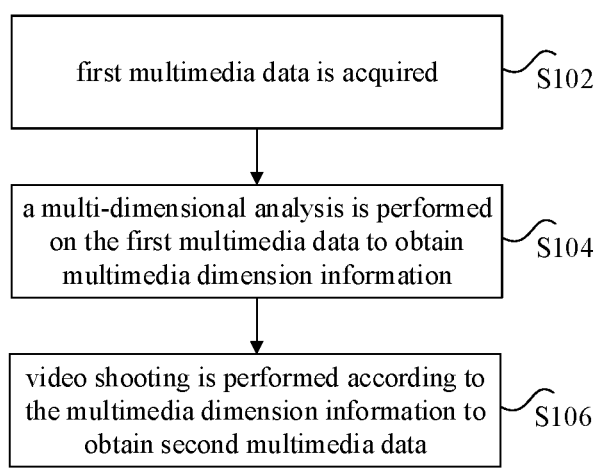
FIG. 1 is a flow chart showing a multimedia data processing method according to some embodiments of the present disclosure.

FIG. 1 is a flow chart showing a multimedia data processing method according to some embodiments of the present disclosure. As shown in FIG. 1, the method includes the following steps.

Step S102: first multimedia data is acquired.

It should be noted that the above-mentioned first multimedia data is multimedia data that the user wants to imitate and shoot; and in some embodiments, the first multimedia data is video data.

Optionally, the mobile device can acquire the first multimedia data. A mobile device is a device with a multimedia data processing capability, which can be, but is not limited to, interactive devices such as smart phones and tablets. Specifically, when a user is watching a video, the mobile device caches the video (that is, the first multimedia data). When the user wants to simulate the shooting of the video, the user inputs the video to a client installed on the mobile device, and the client acquires multimedia data corresponding to the video. In addition, the client can also acquire a network address corresponding to a resource of the first multimedia data through the Internet, and acquire the first multimedia data from the Internet according to the network address. In this scene, the mobile device does not need to download or cache the multimedia data, which reduces the local memory usage of mobile devices.

Step S104: a multi-dimensional analysis is performed on the first multimedia data to obtain multimedia dimension information.

It should be noted that the multimedia dimension information includes at least one of: scene information of a scene included in the first multimedia data, and a switch effect among multiple scenes when the multimedia data includes the multiple scenes. The scene information includes at least one of: a background music, a scene object (for example, people, an animal, a scenery), a scene effect (for example, a filter, a text, a special effect, etc.), and camera information (for example, a position and an angle of the camera).

Optionally, the client uses an Artificial Intelligence (AI) intelligent analysis video technology to intelligently analyze the first multimedia data, in which the multi-dimensional analysis is mainly performed on the voice, text, face, object, scene, etc., of the first multimedia data.

Step S106: video shooting is performed according to the multimedia dimension information to obtain second multimedia data.

Optionally, after the multimedia dimension information of the first multimedia data is obtained, the client performs the video shooting according to the multimedia dimension information. For example, the client determines that the first multimedia uses a filter named "Autumn Fairy Tale" by analyzing the first multimedia data, then when the video is shot, the client uses the filer named "Autumn Fairy Tale" to shoot the video to obtain the second multimedia data. The first multimedia data is an imitated video, and the second multimedia data is a video shot by imitating the first multimedia data.

Based on the solution defined in the steps S102 to S106 above, it can be known that the multimedia data is analyzed, and the video is shot according to the information obtained by analyzing; the multi-dimensional analysis is performed on the first multimedia data after the first multimedia data is obtained, to obtain multimedia dimension information; and finally, the video is shot according to the multimedia dimension information to obtain the second multimedia data.

It is easy to notice that the filter, special effects, transitions and other information of the first multimedia data can be obtained by analyzing the first multimedia data, and then the user adopts the same multimedia dimension information as the first multimedia data to shoot the video, to obtain the second multimedia data with the same effect as the first multimedia data. Since the second multimedia data is obtained by shooting according to the information which is obtained by analyzing the first multimedia data, the second multimedia data has the same effect as the first multimedia data.

In view of the above, the solution provided by the present disclosure achieves the purpose of imitating and shooting of the multimedia data, thereby achieving the technical effect of generating a video with the same effect as the source multimedia data, providing the shooting experience to the user, and then solving the technical problem of low effect of the imitation shooting of the video due to the inability to obtain the information of the video to be imitated, known to the inventors.

In an optional embodiment, before the first multimedia data is acquired, the client also detects a video shooting instruction. When the video shooting instruction is detected as an imitation shooting instruction, the shooting device is controlled to enter an imitation shooting mode. When the video shooting instruction is detected as a regular shooting instruction, the shooting device is controlled to enter the regular shooting mode.

It should be noted that the imitation shooting mode is configured to shoot according to an existing multimedia data, and obtain multimedia data with the same shooting effect as the existing multimedia data.

Optionally, the user can select the mode of video shooting through the client before shooting the video, for example, the user can select the desired shooting mode on the client through voice control or touch operation. If the user selects the imitation shooting mode, the client will receive the imitation shooting instruction. After the imitation shooting instruction is received, the client will acquire the imitated multimedia data (that is, the first multimedia data), and analyze the first multimedia data.

In some embodiments, the first multimedia data may include multiple scenes. For example, a first scene is in a park and a second scene is at home. The multimedia dimension information corresponding to different scene numbers may also be different. Therefore, in the process of multi-dimensional analysis of the first multimedia data, the client needs to detect the number of scenes included in the first multimedia data.

Specifically, the client detects the number of scenes constituting the first multimedia data. In the case where the number of scenes is detected as multiple, switch effects among the multiple scenes and scene information corresponding to each scene are acquired; in the case where the number of scenes is detected as one, the scene information corresponding to the scene is acquired.

It should be noted that in the case of multiple scenes, the scene switching is required among the multiple scenes, and the switching among the multiple scenes has different switch effects, which may also affect the visual effect of the final generated video. Therefore, when the number of scenes is multiple, in addition to acquiring the scene information, it is also necessary to acquire the switch effects among the multiple scenes. Optionally, the switch effects among the multiple scenes include, but are not limited to, a black screen flip switch scene, and no scene within a preset time period when switching between two scenes.

In an optional embodiment, the client detects a scene corresponding to each frame in the first multimedia data, and then determines the number of scenes constituting the first multimedia data according to a matching degree of scenes corresponding to two adjacent frames. For example, the client detects that a scene corresponding to a first frame of video is a first scene, and a scene corresponding to a second frame of video is a second scene; the first frame video and the second frame video are two adjacent frames of video. The first scene and the second scene are two different scenes, then the client determines that the first multimedia data includes two scenes. At this time, the client acquires the switch effect when the switching is performed between the two scenes.

After the number of scenes included in the first multimedia data is determined, the client further identifies each scene. In the case where the first multimedia data includes only one scene, the client identifies the entire first multimedia data. The identifying of the first multimedia data includes identifying of whether each scene of the first multimedia data includes a preset object; the preset object can be a person or an animal. In the case of detecting that the scene object includes a preset object, the client identifies object information of the preset object; the object information includes at least one of: an expression, an action, and a special effect of the preset object.

Optionally, when detecting that the first multimedia data includes a person, the client identifies an expression, an action, and a beauty effect of the person, and identifies whether the multimedia data corresponding to the scene includes the filter, the text, the special effect, etc. When detecting that the first multimedia data does not include people but only includes scenery, the client only identifies whether the multimedia data corresponding to the scene includes the filter, the text, the special effect, etc. The user can directly use all the above-identified data when imitating and shooting.

In an optional embodiment, in a case where the first multimedia data includes a plurality of scenes, the client acquires scene information corresponding to each scene in the first multimedia data and switch effects among the plurality of scenes, and then shoots a video according to the scene information to obtain third multimedia data corresponding to each scene, and sets switch effects among multiple third multimedia data according to the switch effect, to obtain the second multimedia data. For example, the first multimedia data includes two scenes, the first scene uses the filer named "Autumn Fairy Tale", the second scene uses a regular script text, and the switch effect between the first scene and the second scene is the black screen flip switch, then the client turns on the tiler named "Autumn Fairy Tale" in the process that the user uses the client to shoot the video in the first scene; and the client uses the regular script text to annotate in the process of shooting the video in the second scene, and sets the switch effect of these two scenes to the black screen flip switch.

In another optional embodiment, in the case where the first multimedia data includes one scene, the client acquires the scene information corresponding to the first multimedia data, and shoots the video according to the scene information to obtain the second multimedia data.

It should be noted that, in the case where the first multimedia data includes multiple scenes, the client simulates and shoots for each scene according to the multimedia dimension information corresponding to the first multimedia data. In the case where the first multimedia data includes one scene, the client directly shoots a video.

In some embodiments, after acquiring the multimedia dimension information corresponding to the first multimedia data through the above content, the client can start imitating and shooting. When shooting, the filter, effect, special scene, beauty, action, text, music and other information of the source video (that is, the first multimedia data) identified above can be used directly. The user only needs to shoot the video on the identified template by following the people or landscapes in the source video. In order to make the shot video achieve a better shooting effect, in the process of video shooting, the shooting situation of the user is tracked and displayed on a display interface of the client in real time, and the user can be intelligently reminded how to control the camera.

Specifically, in the process of shooting the video according to the multimedia dimension information to obtain the second multimedia data, the client detects the matching degree between the second multimedia data and the corresponding scene; camera control information is generated when the matching degree is less than a preset matching degree; and prompt information is generated according to the camera control information. The prompt information is configured to cause the user to control the shooting device to shoot the video according to the camera control information.

It should be noted that in the process of shooting the video by the user according to the multimedia dimension information, the client may also receive a control instruction from the user. The control instruction is configured to instruct the client to enter the imitation shooting mode or a co-production mode. In addition, after the shooting is completed, the user can browse the shooting effect through the display interface of the client, or separately edit the video of a certain scene to use other effects, etc. The video is saved after the editing is completed, to complete the imitation shooting video.

Figure 2:
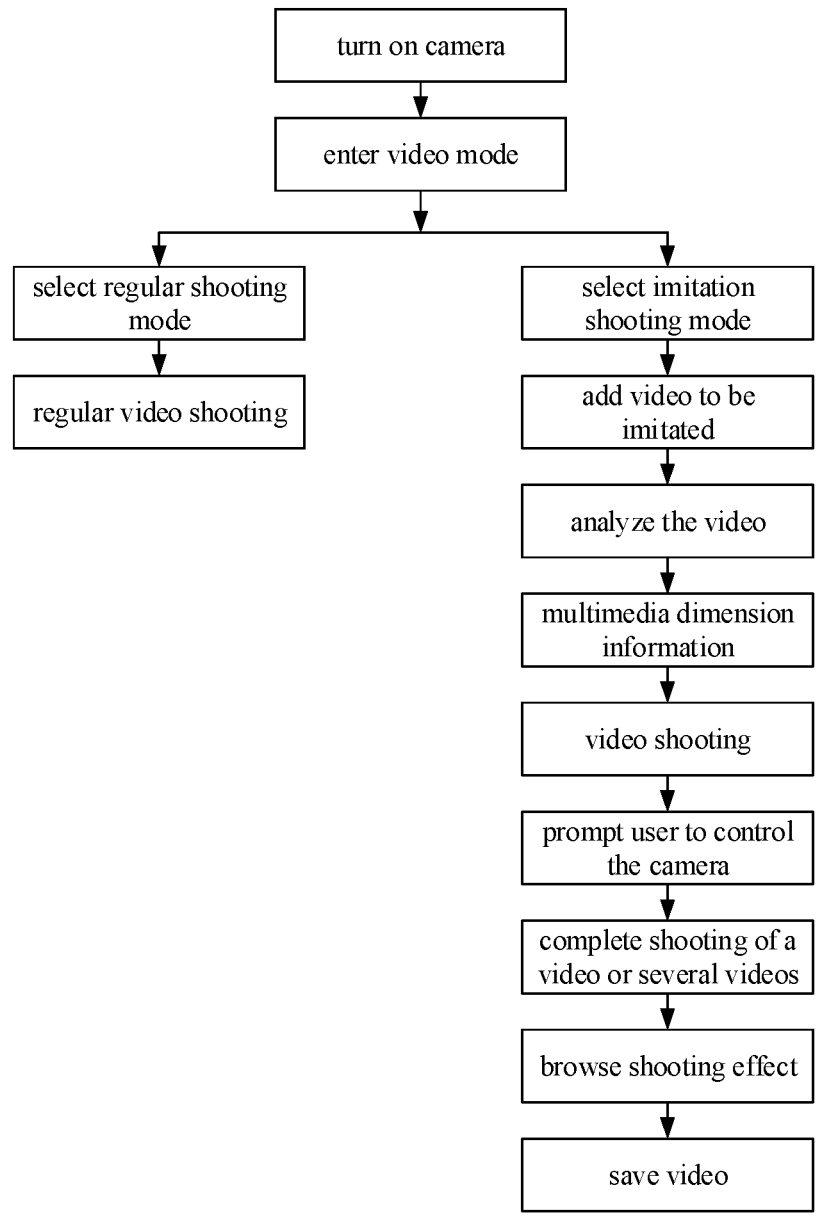
FIG. 2 is a flow chart showing a multimedia data processing method according to an optional embodiment of the present disclosure.

In an optional embodiment, FIG. 2 shows a flow chart showing a multimedia data processing method provided by the present disclosure. Specifically, the user turns on the camera of the mobile device to control the client to enter the video shooting mode. If the user selects the regular shooting mode, the client will receive the regular shooting instruction and perform the video shooting known to the inventors; if the user selects the imitation shooting mode, then the client will receive the imitating shooting instruction and perform the imitation shooting. In the imitation shooting mode, the client prompts the user to add a video that needs to be imitated. After the video is added, the client analyzes the video to obtain the multimedia dimension information of the video, such as the filter, special effect, transition effect, camera information, etc. Then the user starts to shoot one or several videos. In the process of shooting one or several videos by the user, the client performs corresponding processing on the video in progress according to the relevant information of the source video, and reminds the user in real time how to control the position and angle of the camera, and also prompt the user whether to perform imitation shooting or co-production shooting simultaneously. After the shooting of one or several videos is completed, the user can browse the shooting effect through the display interface of the client, or separately edit the video of a certain scene to use other effects, etc. The video is saved after the editing is finished to complete the imitation shooting video.

In view of the above, the solution provided by the disclosure uses AI technology to intelligently analyze the video that the user wants to imitate and shoot, analyze the video filters, special effects, transitions, camera control, etc., and guide the user to shoot after the analysis, and edit the video after shooting, thereby increasing the user's interest in video shooting, closing the distance with the times popular, and also improving the user experience of to the video, and enriching the user's experience.

Embodiment II

Figure 3:
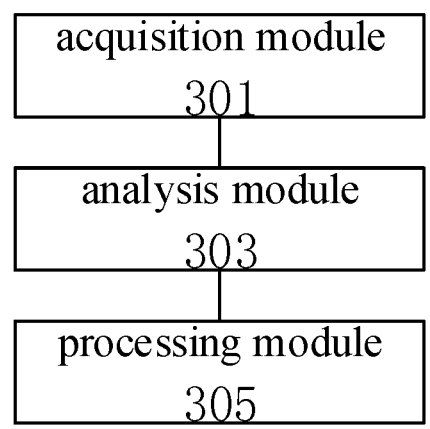
FIG. 3 is a schematic diagram illustrating a multimedia data processing apparatus according to some embodiments of the present disclosure.

According to some embodiments of the present disclosure, a multimedia data processing apparatus is further provided. It should be noted that the apparatus can execute the multimedia data processing method in Embodiment I, where FIG. 3 is a schematic diagram illustrating a multimedia data processing apparatus. As shown in FIG. 3, the apparatus includes: an acquisition module 301, an analysis module 303, and a processing module 305.

The acquisition module 301 is configured to obtain first multimedia data; the analysis module 303 is configured to perform a multi-dimensional analysis on the first multimedia data to obtain multimedia dimension information; and the processing module 305 is configured to perform video shooting according to the multimedia dimension information to obtain second multimedia data.

It should be noted that the above-mentioned acquisition module 301, analysis module 303, and processing module 305 correspond to the steps S102 to S106 of the above-mentioned embodiments, and the three modules implement the same examples and application scenes as the corresponding steps, but are not limited to the contents disclosed in the above embodiments.

In an optional solution, the analysis module includes: a first detection module and a first acquisition module. The first detection module is configured to detect the number of scenes constituting the first multimedia data. The first acquisition module is configured to acquire switching effects among a plurality of scenes and scene information corresponding to each scene when the number of scenes is detected to be multiple.

In an optional solution, the analysis module includes: a second detection module and a second acquisition module. The second detection module is configured to detect the number of scenes constituting the first multimedia data. The second acquisition module is configured to obtain scene information corresponding to the scene when the number of scenes is detected as one.

In an optional solution, the second detection module includes: a third detection module and a first determination module. The third detection module is configured to detect a scene corresponding to each frame in the first multimedia data. The first determination module is configured to determine the number of scenes constituting the first multimedia data according to a matching degree between two scenes corresponding to two adjacent frames.

In an optional solution, in a case where it is detected that a scene object includes a preset object, the multimedia data processing apparatus further includes an identification module. The identification module is configured to identify object information of the preset object. The object information includes at least one of: an expression, an action, and a special effect of the preset object.

In an optional solution, the processing module includes: a third acquisition module, a first processing module, and a second processing module. The third acquisition module is configured to acquire scene information corresponding to each scene in the first multimedia data and switching effects among a plurality of scenes. The first processing module is configured to perform video shooting according to the scene information to obtain third multimedia data corresponding to each scene. The second processing module is configured to set a switching effect between a plurality of third multimedia data according to the switching effect to obtain second multimedia data.

In an optional solution, the processing module includes: a fourth acquisition module and a third processing module. The fourth acquisition module is configured to acquire scene information corresponding to the first multimedia data. The third processing module is configured to perform video shooting according to the scene information to obtain second multimedia data.

In an optional solution, in the process of performing the video shooting according to the multimedia dimension information to obtain the second multimedia data, the multimedia data processing apparatus further includes: a fourth detection module, a first generation module, and a second generation module. The fourth detection module is configured to detect a matching degree between the second multimedia data and the corresponding scene. The first generation module is configured to generate camera control information when the matching degree is less than a preset matching degree. The second generation module is configured to generate prompt information according to the camera control information. The prompt information is configured to cause the user to control the shooting device to perform the video shooting according to the camera control information.

In an optional solution, the multimedia data processing apparatus further includes: a fifth detection module, a first control module, and a second control module. The fifth detection module is configured to detect a video shooting instruction. The first control module is configured to control the shooting device to enter an imitation shooting mode when the video shooting instruction is detected as an imitation shooting instruction. The imitation shooting mode is configured to perform the video shooting according to the existing multimedia data to obtain multimedia data with the same shooting effect as the existing multimedia data. The second control module is configured to control the shooting device to enter a regular shooting mode when the video shooting instruction is detected as a regular shooting instruction.

Embodiment III

According to another aspect of the embodiment of the present disclosure, a storage medium is further provided, which includes a stored program; and the program, when executed, controls the device where the storage medium is located to perform the multimedia data processing method in the Embodiment I.

Embodiment IV

According to another aspect of the embodiment of the present disclosure, a processor for executing a program is provided, and the multimedia data processing method in the Embodiment I is performed when the program is executed.

The sequence numbers of the above-mentioned embodiments of the present disclosure are only for description, and do not represent the superiority or inferiority of the embodiments.

In the above-mentioned embodiments of the present disclosure, the description of each embodiment has its own focus. For parts that are not described in detail in the embodiment, reference can be made to related descriptions of other embodiments.

In the several embodiments provided in the present disclosure, it should be understood that the disclosed technical content can be implemented in other ways. The device embodiments described above are merely illustrative. For example, the division of the units can be a logical function division, and there may be other divisions in actual implementation, for example, multiple units or components can be combined or integrated into another system, or some features can be ignored or not implemented. In addition, the displayed or discussed mutual coupling or direct coupling or communication connection can be indirect coupling or communication connection through some interfaces, units or modules, and can be in an electrical form or other forms.

The units described as separate components may or may not be physically separated, and the components displayed as units may or may not be physical units, that is, they may be located in one place, or they may be distributed on multiple units. Some or all of the units can be selected according to actual requirements to achieve the purposes of the solution of the embodiment.

In addition, function units in various embodiments of the present disclosure can be integrated into one processing unit, or each unit can exist alone physically, or two or more units can be integrated into one unit. The above-mentioned integrated unit can be implemented in the form of hardware or software function unit.

If the integrated unit is implemented in the form of a software function unit and sold or used as an independent product, it can be stored in a computer-readable storage medium. Based on such understanding, the technical solution of the present disclosure essentially or the part that contributes to the technology known to the inventors or all or part of the technical solution can be embodied in the form of a software product, and the computer software product is stored in a storage medium, including that several instructions are configured to enable a computer device (which may be a personal computer, a server, or a network device, etc.) to perform all or part of the steps of the methods described in the various embodiments of the present disclosure. The aforementioned storage medium includes: a U disk, a Read-Only Memory (ROM), a Random Access Memory (RAM), a mobile hard disk, a magnetic disk or an optical disk and other media that can store program codes.

The above are merely preferred embodiments of the present disclosure. It should be noted that those of ordinary skill in the art can make several improvements and modifications without departing from the principles of the present disclosure, and these improvements and modifications also should be regarded as the protection scope of the present disclosure.

What is claimed is:

1. A multimedia data processing method, comprising:
   acquiring first multimedia data;
   performing a multi-dimensional analysis on the first multimedia data to obtain multimedia dimension information; and
   performing video shooting according to the multimedia dimension information to obtain second multimedia data;
   wherein the performing the multi-dimensional analysis on the first multimedia data to obtain the multimedia dimension information comprises:
      detecting a number of scenes constituting the first multimedia data; and
      when detecting that the number of scenes is multiple, acquiring a switching effect among multiple scenes and scene information corresponding to each scene;
      wherein the detecting the number of scenes constituting the first multimedia data comprises:
         detecting a scene corresponding to each frame in the first multimedia data; and
         determining the number of scenes constituting the first multimedia data according to a matching degree between two scenes corresponding to two adjacent frames.

2. The method according to claim 1, further comprising:
   when detecting that a scene object comprises a preset object,
   identifying object information of the preset object, wherein the object information comprises at least one of: an expression, an action, and a special effect of the preset object.

3. The method according to claim 1, further comprising:
   before acquiring the first multimedia data,
   detecting a video shooting instruction;
   when detecting that the video shooting instruction is an imitation shooting instruction, controlling a shooting device to enter an imitation shooting mode, wherein the imitation shooting mode is configured to perform the video shooting according to existing multimedia data to obtain multimedia data with a same shooting effect as the existing multimedia data;
   when detecting that the video shooting instruction is a regular shooting instruction, controlling the shooting device to enter a regular shooting mode.

4. A non-transitory storage medium, on which a program is stored, wherein the program, when executed, controls a device where the storage medium is located to perform the multimedia data processing method of claim 1.

5. A processor, configured to execute a program, wherein the program, when executed, performs the multimedia data processing method of claim 1.

6. A multimedia data processing method, comprising:
   acquiring first multimedia data;
   performing a multi-dimensional analysis on the first multimedia data to obtain multimedia dimension information; and
   performing video shooting according to the multimedia dimension information to obtain second multimedia data;
   wherein the performing the multi-dimensional analysis on the first multimedia data to obtain the multimedia dimension information comprises:
      detecting a number of scenes constituting the first multimedia data; and
      when detecting that the number of scenes is one, acquiring scene information corresponding to the scene;
      wherein the detecting the number of scenes constituting the first multimedia data comprises:
         detecting a scene corresponding to each frame in the first multimedia data; and
         determining the number of scenes constituting the first multimedia data according to a matching degree between two scenes corresponding to two adjacent frames.

7. The method according to claim 6, further comprising:
   when detecting that a scene object comprises a preset object, identifying object information of the preset object, wherein the object information comprises at least one of: an expression, an action, and a special effect of the preset object.

8. The method according to claim 6, wherein the performing the video shooting according to the multimedia dimension information to obtain the second multimedia data comprises:
   acquiring scene information corresponding to the first multimedia data; and
   performing the video shooting according to the scene information to obtain the second multimedia data.

9. The method according to claim 8, further comprising:
   during performing the video shooting according to the multimedia dimension information to obtain the second multimedia data,
   detecting a matching degree between the second multimedia data and a corresponding scene;
   generating camera control information when the matching degree is less than a preset matching degree; and
   generating prompt information according to the camera control information, wherein the prompt information is configured to cause a user to control a shooting device to perform the video shooting according to the camera control information.

10. The method according to claim 6, further comprising:
before acquiring the first multimedia data,
detecting a video shooting instruction;
when detecting that the video shooting instruction is an imitation shooting instruction, controlling a shooting device to enter an imitation shooting mode, wherein the imitation shooting mode is configured to perform the video shooting according to existing multimedia data to obtain multimedia data with a same shooting effect as the existing multimedia data; and
when detecting that the video shooting instruction is a regular shooting instruction, controlling the shooting device to enter a regular shooting mode.

11. A multimedia data processing method, comprising:
acquiring first multimedia data;
performing a multi-dimensional analysis on the first multimedia data to obtain multimedia dimension information; and
performing video shooting according to the multimedia dimension information to obtain second multimedia data;
wherein the performing the multi-dimensional analysis on the first multimedia data to obtain the multimedia dimension information comprises:
   detecting a number of scenes constituting the first multimedia data; and
   when detecting that the number of scenes is multiple, acquiring a switching effect among multiple scenes and scene information corresponding to each scene;
wherein the performing the video shooting according to the multimedia dimension information to obtain the second multimedia data comprises:
   acquiring scene information corresponding to each scene in the first multimedia data and a switching effect among the multiple scenes;
   performing the video shooting according to the scene information to obtain third multimedia data corresponding to each scene; and
   setting a switching effect among multiple third multimedia data according to the switching effect, to obtain second multimedia data.

12. The method according to claim 11, further comprising:
when detecting that a scene object comprises a preset object, identifying object information of the preset object, wherein the object information comprises at least one of: an expression, an action, and a special effect of the preset object.

13. The method according to claim 11, further comprising:
during performing the video shooting according to the multimedia dimension information to obtain the second multimedia data,
detecting a matching degree between the second multimedia data and a corresponding scene;
generating camera control information when the matching degree is less than a preset matching degree; and
generating prompt information according to the camera control information, wherein the prompt information is configured to cause a user to control a shooting device to perform the video shooting according to the camera control information.

14. The method according to claim 11, further comprising:
before acquiring the first multimedia data,
detecting a video shooting instruction;
when detecting that the video shooting instruction is an imitation shooting instruction, controlling a shooting device to enter an imitation shooting mode, wherein the imitation shooting mode is configured to perform the video shooting according to existing multimedia data to obtain multimedia data with a same shooting effect as the existing multimedia data; and
when detecting that the video shooting instruction is a regular shooting instruction, controlling the shooting device to enter a regular shooting mode.

\* \* \* \* \*